United States Patent [19]

Gutek

[11] 4,443,502

[45] Apr. 17, 1984

[54] LIQUID ORGANOSILOXANE RESIN COMPOSITIONS

[75] Inventor: Beth I. Gutek, Freeland, Mich.

[73] Assignee: Dow Corning Corporation, Midland, Mich.

[21] Appl. No.: 484,333

[22] Filed: Apr. 12, 1983

[51] Int. Cl.³ .............................................. A23P 1/00
[52] U.S. Cl. .................................... 427/387; 524/261; 524/267; 524/268; 525/477; 528/17; 528/33
[58] Field of Search ...................... 524/261, 267, 268; 525/477; 528/17, 33; 427/387

[56] References Cited

U.S. PATENT DOCUMENTS

| | | | |
|---|---|---|---|
| 3,274,154 | 9/1966 | Kendrick et al. | 528/17 |
| 3,280,214 | 10/1966 | Mitchell | 525/477 |
| 3,629,228 | 12/1971 | Hartlein et al. | 528/33 |
| 3,639,155 | 2/1972 | Hartlein et al. | 525/477 |

FOREIGN PATENT DOCUMENTS 6095633  8/1981  Japan .................................. 524/268

Primary Examiner—Melvyn I. Marquis
Assistant Examiner—D. LeRoy
Attorney, Agent, or Firm—Robert Spector

[57] ABSTRACT

This invention provides liquid coating compositions comprising (a) a film-forming component comprising at least one organosiloxane block copolymer wherein the molar ratio of phenylsiloxane units to other units present in the block copolymer is greater than 0.35 to 1, and (b) a solvent comprising at least 45% by weight of a cyclic polydimethylsiloxane of the formula $[(CH_3)_2SiO]_x$ where the average value of x is from 3 to 8 and where said organosiloxane block copolymer constitutes no more than 60% of the combined weight of the copolymer and solvent. Using the present compositions, relatively thin coatings of the block copolymer can be applied to cured polyorganosiloxane elastomers and a variety of synthetic organic polymers.

25 Claims, No Drawings

LIQUID ORGANOSILOXANE RESIN COMPOSITIONS

BACKGROUND OF THE INVENTION

Field of the Invention

This invention relates to liquid compositions containing solubilized polyorganosiloxanes. More particularly, this invention relates to liquid compositions containing relatively low concentrations of organosiloxane block copolymers. Using these compositions, thin coatings of the copolymers can be applied to a variety of substrates, including polydiorganosiloxane elastomers and organic polymers.

The prior art teaches that liquid organic hydrocarbons such as toluene are useful solvents for preparing organosiloxane block copolymer resins as well as vehicles from which coatings of the resins can be applied to silicone rubber. U.S. Pat. No. 3,639,155 to R. C. Hartlein and H. L. Vincent, which issued on Feb. 1, 1972, discloses that the copolymers described in this patent are soluble in the organic liquids conventionally used for silicones, such as aromatic hydrocarbons, chlorinated aliphatic hydrocarbons, and ketones. Useful solvents include toluene, xylene, benzene, methylisopropyl ketone and trichlorofluoromethane. Aromatic hydrocarbons such as toluene and xylene are relatively inexpensive compared to many of the other organic liquids disclosed in the aforementioned Hartlein and Vincent patent, and for this reason would be among the preferred solvents for use in preparing coating compositions.

U.S. Pat. No. 3,280,214, which issued to D. Mitchell on Oct. 18, 1966, describes room temperature curable organosiloxane block copolymers containing blocks of from 5 to 400 dimethylsiloxane units and blocks formed by the hydrolysis of organotrihalosilanes in which the organic group bonded to silicon is aryl, alkaryl, or haloaryl. A compound having at least two silicon atoms bonded to three halogen atoms functions as a coupling agent between the dimethylsiloxane and monoarylsiloxane blocks of the final copolymer.

The block copolymers disclosed by Mitchell and others such as Vincent in U.S. Pat. No. 3,328,481, which issued on June 27, 1967, contain substantial concentrations of phenylsiloxane units to achieve higher levels of heat and oxidation resistance relative to polymers containing only methylsiloxane units. Mitchell teaches that the phenyl-containing siloxane units constitute up to 95 mol % of the siloxane units present in the copolymer. While the presence of phenyl or other aryl radical bonded to silicon is desirable for imparting heat stability to the copolymer, reactants containing these radicals may not be compatible with the polydimethylsiloxanes often employed as the coreactant for preparing the copolymer. The incompatibility of polydimethylsiloxanes and phenylsiloxane polymers was recognized by Mitchell in the aforementioned U.S. Pat. No. 3,280,214, which teaches that it is necessary to at least partially react a polydimethylsiloxane with the arylsiloxane components in the presence of a condensation catalyst to achieve a compatible mixture that can be further polymerized in an organic solvent such as toluene.

Room temperature curable organosiloxane block copolymers are also described in U.S. Pat. No. 3,629,228 to R. C. Hartlein and C. R. Olson, which issued on Dec. 21, 1971. The copolymers disclosed in this patent comprise blocks of diorganosiloxane units wherein at least 80% of the hydrocarbon radicals are methyl, organosiloxane blocks containing an avrage of from 1 to 1.3 hydrocarbyl radicals per silicon atom, at least 50% of the hydrocarbyl radicals being phenyl or other aryl radical and terminal or "endblocking" monoorganoalkoxysiloxane units located at the ends of repeating unit sequences. The polymer is cured by reaction of the alkoxy groups in the terminal units at ambient temperature in the presence of moisture and a catalyst composition that includes an organotitanate and an amine.

Any of the aforementioned room temprature curable organosiloxane block copolymers are useful coating materials for a variety of substrates, including silicone rubber. The copolymers described in U.S. Pat. No. 3,629,228 are unique by virtue of their unexpected resistance to accumulating dirt. This property makes the copolymers particularly useful as coating materials for silicone rubber, which has a tendency to attract dirt and assume an undesirable appearance.

Because the room temperature vulcanizable organosiloxane block copolymers disclosed in the aforementioned Hartlein and Vincent patent can be solids or relatively high viscosity liquid materials at ambient temperature, if one desired to apply relatively thin coatings of these materials, i.e., coatings less than about 5 mils (0.013 cm.) thick, it would usually be necessary to dilute the copolymer to a concentration level below 60% by weight. Applicant has found that at these concentration levels preferred organosiloxane block copolymers will not form coherent films on cured polydimethylsiloxane rubber. It is therefore not feasible to apply thin coatings of these copolymers at room temperature in accordance with the teaching of Hartlein and Vincent using liquid aromatic hydrocarbons as the solvent.

Japanese Patent Publication No. 82/5985 teaches that silicone rubber can be coated using polysiloxane compositions obtained by reacting a copolymer containing $SiO_{4/2}$ and $R_3SiO_{1/2}$ units, where R represents a monovalent hydrocarbon group, with a polydiorganosiloxane having a viscosity of from 10,000 to 2,000,000 centistokes (0.01 to 20 m²/sec) at 25° C. The resultant reaction product is dissolved in a mixture of a liquid hydrocarbon and a volatile organosilicon compound, which can be a linear or cyclic polydiorganosiloxane exhibiting a boiling point of from 70° to 250° C. under atmospheric pressure. In the preferred embodiments and examples of this publication, the rubber is a polydimethylsiloxane, the resin composition contains an aminoalkylsilane, and octamethylcyclotetrasiloxane is used as the solvent for the resin.

If one were to consider replacing the organosiloxane resin described in the examples of the aforementioned Japanese patent publication with a block copolymer containing phenylsiloxane units such as those described in any of the aforementioned U.S. patents, based on the teaching of the aforementioned patent to Mitchell, it would be reasonable to expect a liquid polydimethylsiloxane to be incompatible with the block copolymer. Mitchell advises that prolonged heating in the presence of a condensation catalyst may be necessary to obtain a homogeneous, single phase reactant from a phenyl-containing polysiloxane and a polydimethylsiloxane. Experimental data in the present specification demonstrate that an organosiloxane copolymer of the type disclosed in the aforementioned patent to Hartlein and Olson, which contains silicon-bonded phenyl groups, is incompatible with a polydimethylsiloxane exhibiting a viscosity of $5 \times 10^{-6}$ m²/sec.

The prior art does not teach suitable solvents for coating compositions having relatively low concentrations of organosiloxane block copolymers containing both dimethylsiloxane and phenylsiloxane units. Neither does the prior art teach solvents for the block copolymers which are compatible with substrate surfaces of both polyorganosiloxane rubbers, also referred to as silicone rubbers, and a variety of synthetic organic polymers in the absence of a coupling agent such as the aminoalkylsilane disclosed in the examples of the aforementioned Japanese patent publication.

It is therefore an objective of this invention to define a class of coating compositions containing up to about 60% by weight of solubilized organosiloxane block copolymers having more than about 20mol % of phenylsiloxane units in the polymer.

A second objective of this invention is to provide a method for applying relatively thin coatings of siloxane block copolymers to a variety of substrates, including silicone rubbers and synthetic organic polymers.

SUMMARY OF THE INVENTION

This invention provides liquid coating compositions comprising (a) a film-forming component comprising at least one organosiloxane block copolymer wherein the molar ratio of phenylsiloxane units to other repeating units present in the block copolymer is greater than 0.35 to 1, and (b) a solvent comprising at least 45% by weight of a cyclic polydimethylsiloxane of the formula $[(CH_3)_2SiO]_x$ where the average value of x is from 3 to 8 and where said organosiloxane block copolymer constitutes no more than 60% of the combined weight of the copolymer and solvent. Using the present compositions, relatively thin coatings of the block copolymer can be applied to cured silicone rubbers and a variety of synthetic organic polymers.

DETAILED DESCRIPTION OF THE INVENTION

The liquid coating compositions of this invention comprise (A) at least one solubilized, room temperature curable organosiloxane block copolymer and (B) a solvent for said copolymer comprising at least 45% by weight of at least one cyclic polydimethylsiloxane of the formula $[(CH_3)_2SiO]_x$ where x has an avrage value of from 3 to 8, inclusive, said block copolymer comprising (1) at least one diorganosiloxane block containing an average of from 15 to 350 repeating units per block where at least 80 mol % of the units are dimethylsiloxane units, any remaining units being selected from methylphenylsiloxane and methylsiloxane, (2) at least one block containing at least 3 repeating units of the formula

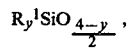

where y has a value of from 1 to 1.3 and $R^1$ represents a monovalent hydrocarbon radical wherein at least 50% of the radicals are phenyl with any remainder being selected from the group consisting of vinyl, methyl, ethyl and propyl radicals, and where the molar ratio of units in the diorganosiloxane block to

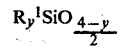

units is from 0.7 to 3.5, and (3) from 3 to 25% based on the total number of units present in said block copolymer, of terminal units represented by the formula

where z has an average value of from 1.8 to 2, inclusive, $R^2$ is alkyl containing from 1 to 6 carbon atoms, phenyl or vinyl, Y is selected from the group consisting of alkoxy containing from 1 to 5 carbon atoms, acetoxy and radicals of the formula -ON=Z where Z is

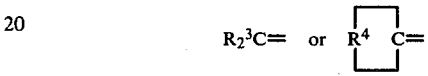

where each $R^3$ contains from 1 to 4 carbon atoms and is individually selected from monovalent hydrocarbon radicals and halogenated monovalent hydrocarbon radicals and $R^4$ contains from 2 to 5 carbon atoms and is selected from the group consisting of divalent hydrocarbon radicals and halogenated divalent hydrocarbon radicals, and wherein said block copolymer constitutes at least 5% of the total weight of the composition.

This invention also provides a method for coating silicone rubber and organic polymers with an organosiloxane block copolymer. The method comprises applying to a substrate containing an organic polymer or a cured silicone rubber at least one layer of a coating composition of this invention, evaporating the volatile solvents and curing the block copolymer.

The organosiloxane block copolymers suitable for use as the film forming component of the present coating compositions typically contain diorganosiloxane blocks containing from 5 to 350 or more units, as previously defined, alternating with blocks containing at least 3 siloxane units of the general formula

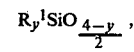

where $R^1$ and y are as previously defined. The copolymer is further characterized as containing from 0.7 to 3.5 diorganosiloxane block units per

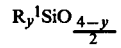

unit, and terminal units having an average of from 1.8 to 2 silicon-bonded alkoxy, acetoxy or ketoxime groups per terminal unit.

The terminal units are typically introduced into the copolymer by reacting a hydroxyl-containing organosiloxane block copolymer with a trifunctional silane of the formula $R^2SiY_3$ where $R^2$ and Y are as previously defined. The hydroxyl-containing block copolymer can be prepared as described in the prior art, including the previously cited patents to Vincent, Hartlein and Vincent, and Mitchell. A preferred method is described in the accompanying examples.

In some instances all of the aforementioned trifunctional silane molecules will react with only one hydroxyl group, in which case the value of z in the foregoing formula

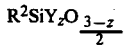

will be 2. However there may be a statistically determinable number of instances in which some molecules of trifunctional silane will react with two hydroxyl groups. For this reason the value of z in the formula for the terminal unit is defined as from 1.8 to 2.

The terminal units enable the block copolymers to be cured at ambient temperature in the presence of atmospheric moisture.

Room temperature vulcanizable organosiloxane block copolymers and methods for their preparation are diclosed in the prior art, including the previously discussed U.S. Pat. Nos. 3,280,214; 3,328,481; 3,639,155; and 3,629,228, all of which are herby incorporated in their entirety by reference.

A preferred class of organosiloxane block copolymers is described in the aforementioned U.S. Pat. No. 3,639,155. Most preferably the copolymers contain terminal units represented by the general formula

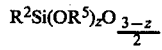

where $R^2$ and z are as previously defined and $R^5$ represents an alkyl radical containing from 1 to 5 carbon atoms.

The silane $R^2SiY_3$ employed to form the preferred terminal units of the block copolymer is a trialkoxysilane wherein the hydrocarbyl radical represented by $R^2$ is lower alkyl, most preferably methyl, and the alkoxy group is methoxy or ethoxy. The reaction between this silane and the hydroxyl terminated block copolymer is preferably conducted in the presence of a catalytically effective amount of an organic titanium compound to form a room temperature curable organosiloxane block copolymer suitable for use in the coating compositions of this invention. Most preferably the titanium compound is a tetraalkyl titanate, such as tetrabutyl titanate, or a chelated titanium compound such as diisopropylbis(ethylacetoacetato)titanium.

Other types of room temperature curable block copolymers which are useful as film-forming components in the coating compositions of this invention are disclosed in U.S. Pat. No. 3,607,972, which issued in Sept. 21, 1971, and is hereby incorporated by reference, as a teaching of those copolymers wherein the chemical composition and relative concentration of the units in the diorganosiloxane block are as previously defined for the block copolymers that constitute the film-forming component of the present coating compositions.

Copolymers which are suitable for use in the present coating compositions are typically resinous as distinguished from elastomeric materials, in that when fully cured they exhibit tensile strength values within the range from 1.7 to about 4.5 megapascals (MPa) and elongation values of from 25 to about 50%. In the absence of any solvents, the uncured copolymers can be solid or liquid materials at ambient temperature. Preferred copolymers exhibit a viscosity within the range of from 5 to about 50 centipoise (1.005 to 0.05 pascal seconds, Pa. s) at 25° C., measured as a 40% by weight solution in toluene.

The second required component of the present coating compositions is a solvent for the organosiloxane block copolymer. The solvent comprises at least one cyclic polydimethylsilsane and can be represented by the formula $[(CH_3)_2SiO]_x$ where the average value of x is from 3 to 8, inclusive. The solvent can be a single species, such as octamethylcyclotetrasiloxane, or a mixture containing two or more cyclic polydimethylsiloxanes, so long as the average number of dimethylsiloxane units per molecule is from 3 to 8. Preferably the average value of x is 4.

In addition to being a solvent for the organosiloxane block copolymer, the presence of a cyclic polydimethylsiloxane in a coating composition makes it possible to apply continuous, coherent films of the solubilized block copolymer to cured silicone rubbers and a variety of organic polymers when the solids concentration of the coating composition is 60% by weight or less. Such coherent films cannot be applied using organic liquids, such as toluene, which are taught as being suitable solvents for the organosiloxane block copolymers disclosed in the aforementioned Hartlein and Vincent patent. Preferred coating compositions of this invention contain from 10 to 60% by weight of the block copolymer. The materials referred to herein as silicone rubbers are typically polydiorganosiloxanes, and are well known to those skilled in the art. A preferred class of silicone rubbers for use as substrates with the present coating compositions includes the polydimethylsiloxanes. These silicone rubbers are commercially available and can be cured using a variety of catalysts, curing agents and curing conditions.

The coating compositions of this invention may contain as optional ingredients one or more of the additives conventionally included in organopolysiloxane resin coating compositions. These additives include pigments, reinforcing fillers such as precipitated and fume silicas and carbon black, inert fillers such as ground quartz, flame retardants, and stabilizers to prevent or retard degradation of the cured copolymer in the presence of heat and/or ultraviolet light.

In addition or cyclic polydimethylsiloxanes, the solvent portion of the present coating compositions may contain up to 55%, based on total solvent weight, of organic liquids in which the film-forming organosiloxane block copolymer is soluble.

In accordance with the teaching in the prior art, the organosiloxane block copolymer component of the present coating compositions is prepared in a liquid hydrocarbon, such as toluene, which forms an azeotropic mixture with the water and alcohols formed as by-products during preparation of the copolymer, and facilitates removal of these by-products from the reaction mixture. It would be both inconvenient and costly in terms of labor and energy input to separate all of the organic liquid from the copolymer before combining the latter with the cyclic polydimethylsiloxane to prepare the coating compositions of this invention.

Using the organic solvents disclosed in U.S. Pat. No. 3,639,155, it has been found that coherent coatings cannot be applied to smooth surfaces using compositions containing 60% or less by weight of the organosiloxane block copolymer. Compositions of this type may be required if it is desired to apply coatings less than about 5 mils (0.012 cm.) in thickness. It has now been found that useful coating compositions containing 60% or less by weight of the block copolymer can be prepared if the solvent portion contains at least 45% by weight of one of the cyclic polydimethylsiloxanes of this invention or a mixture containing two or more of these cyclic polydimethylsiloxanes. To ensure formation of coherent films, the minimum concentration of cyclic polydimethylsiloxane present in the solvent portion of the coating composition should be increased from 45% to about 60% by weight as the concentration of block copolymer is decreased from 60% to 20% or less.

The coating compositions of this invention are conveniently prepared by dissolving the desired amount of organosiloxane block copolymer in the cyclic polydimethylsiloxane. It may be desirable to stir the mixture at room temperature or while it is being heated at temperatures of up to about 50° C. to accelerate solubilization of the copolymer. As previously disclosed, the block copolymer can be added as a solution in the organic liquid used as the reaction medium to prepare the copolymer, so long as the amount of organic liquid forms a single phase together with the cyclic polydimethylsiloxane oligomer and provides a coherent film at the final solids concentration of the composition.

The present coating compositions can be applied as coherent films to a variety of chemically dissimilar substrates, including silicone and organic rubbers and a variety of nonelastomeric synthetic organic polymers. The organic rubbers that can be coated using the present compositions include copolymers of butadiene, styrene and acrylonitrile. Typical nonelastomeric substrates include polycarbonates; polyolefins such as polyethylene, polypropylene, and polystyrene; polyesters such as polyethylene terephthalate; polymers of acrylic- and methacrylic acids and esters thereof, such as polymethyl methacrylate; and polyimides.

The present coating compositions can be applied to the substrate using any of the conventional coating techniques, including dipping, spraying, roller coating, and the use of doctor blades.

Preferred substrates for coating using the present compositions include silicone rubbers, most preferably polydimethylsiloxane elastomers. It has been found desirable to coat silicone rubber on to architectural fabrics, particularly those formed from glass fibers, to impart desirable properties to the fabric, particularly resistance to abrasion during flexing of the fabric. One shortcoming of most silicone rubbers is their tendency to attract dirt paticles that tightly adhere to the surface of the rubber. This disadvantage can be overcome by coating the rubber with a composition of this invention.

Coatings applied using the preferred compositions of this invention cure at ambient temperature in the presence of moisture. The curing mechanism and any catalysts required will be determined by the terminal groups present on the organosiloxane block copolymer. Suitable catalysts for the various functionally-terminated block copolymers of this invention are disclosed in the prior art, including the aforementioned patents pertaining to room temperature curable organosiloxane block copolymers.

While the organosiloxane copolymers present in the coating compositions of this invention will cure at ambient temperature, the rate of curing can in some instances be accelerated by heating the coated substrate at temperatures of up to about 100° C.

The following examples are intended to describe preferred embodiments of this invention, and should not be interpreted as limiting the scope of the invention as defined in the accompanying claims. All parts and percentages are by weight unless otherwise specified.

EXAMPLE 1

This example demonstrates the utility of the present coating compositions at more dilute solids concentration than can be achieved using prior art compositions.

A. Preparation of an organosiloxane block copolymer

A reactor equipped with an agitator and water cooled condenser was charged with the followingmaterials under a nitrogen atmosphere:
  1306 parts toluene
  570 parts of a 60% solution in toluene of a partially hydrolyzed phenyltrimethoxysilane containing about 2% of methoxy groups and about 6% of hydroxyl groups
  457 parts of a hydroxyl-terminated polydimethylsiloxane exhibiting a viscosity of 0.08 pascal seconds (Pa. s) at 25° C.
  0.38 part of a 37% aqueous hydrochloric acid solution, and
  0.075 part of a solution of ferric octoate in a liquid hydrocarbon solvent and exhibiting an iron content of 6%

The resultant mixture was heated at the boiling point with stirring. The aqueous portion of the distillate returning from the condenser was collected in a trap and removed while the toluene fraction was allowed to return to the reactor.

Heating was continued with removal of aqueous distillate for 1 ¾ hour. At this time a sample of the reaction mixture formed in a clear film when cured. This test was conducted by withdrawing a sample from the reaction and depositing the sample onto a glass slide. The slide was placed on an electrically heated laboratory "hot plate" equipped with a thermostate having "low," "medium" and "high" settings. The glass plate was heated for 12 minutes with the thermostat at the "medium" setting, and for an additional 12 minutes with the thermostat at the "high" setting.

Once a clear film was obtained, a mixture of 0.12 part of a chromium octoate solution in a hydrocabon solvent and 3.3 parts of toluene was added to the reaction in a single portion. The chromium octoate solution contained 8% of chromium.

Following addition of the chromium octoate, 660 parts of toluene were distilled from the reaction mixture, which was then allowed to cool to 80° C. At this time a mixture of 0.7 part tetrabutyl titanate and 180parts methyltrimethoxysilane were added, followed by 6.6parts of toluene as a rinse to ensure that all of the reagents had passed into the reactor. The contents of the reactor were heated at the boiling point until 677 parts of toluene had been distilled from the reaction and removed. At this time the reaction mixture exhibited viscosity of 0.0024 m$^2$/sec. at 25° C.

The reaction mixture was then cooled to 70° C., at which time a mixture of 3.8 parts of tetrabutyl titanate and 33.8 parts methyltrimethoxysilane was added followed by about 19.8 parts of toluene. The viscosity of the reaction mixture was 0.001275 m$^2$/sec. at 25° C.

The product obtained from the foregoing procedure was a solubilized block copolymer containing 62 mol % dimethylsiloxane units as blocks containing an average of from 35 to 350 repeating units per block, 24.8 mol % phenylsiloxy units as blocks containing an average of at least 3 units each, and 13.5 mol % methylsiloxy units as terminal units. The composition also contained 135 parts of unreacted methyltrimethoxysilane to function as a crosslinking agent during subsequent curing of the composition. The molar ratio of dimethylsiloxane units to phenylsiloxane units was 2.5.

A coating composition of this invention containing 50% by weight of the block copolymer was prepared by combining 100 parts of the aforementioned product, which contained 75% by weight of the copolymer, with 50 parts of octamethylcyclotetrasiloxane. The resultant composition was a clear solution containing 50 weight % of the block copolymer, based on the combined weight of copolymer and solvents, and 67 percent cyclic polydimethylsiloxane based on the combined weight of cyclic polydimethylsiloxane and toluene.

An elastomer substrate was prepared by reacting 90 parts of a hydroxyl-terminated polydimethylsiloxane having a viscosity of 2 Pa.s at 25° C. with 5.4 parts of a mixture containing equal parts by weight of methyltriacetoxysilane and ethyltriacetoxysilane in the presence of a catalytic amount of dibutyltin diacetate and 4.5 parts of fume silica. The elastomer was allowed to cure for from 1 to 3 weeks under ambient conditions before being coated with the aforementioned coating composition.

The coating composition described in the first part of this example was applied to the surface of the aforementioned elastomer substrate using a drawdown bar. The resultant continuous coherent film, cured in about 48 hours under ambient conditions and exhibited a thickness of about 5 mils (0.013 cm.).

Two control coating compositions were prepared by replacing the cyclic polydimethylsiloxane with, in one instance, 50 parts of toluene and in the second instance 50 parts of a trimethylsiloxy-endblocked polydimethylsiloxane exhibiting a viscosity of $5 \times 10^{-6}$ m$^2$/s at 25° C. The composition containing the polydimethylsiloxane was cloudy in appearance and the toluene solution was clear.

Both control formulations were coated onto the aforementioned elastomer substrate as described in the preceding section of this example. Neither of the control compositions formed a coherent film on the substrate.

EXAMPLE 2

This example demonstrates the compatibility of the present coating compositions with a variety of organic polymer substrates.

A coating composition was prepared as described in Example 1 by combining 100 parts of an 75% by weight solution of the block copolymer in toluene with 275 parts of one of the liquids specified in the following table to obtain a solids concentration of 20% by weight. Solutions containing 70% and 50% by weight of the copolymer in toluene were also evaluated.

Each of the solutions was coated using a glass rod onto a horizontal surface of six organic polymer samples in the form of sheets or films and onto a film of the elastomer substrate described in Example 1. The polymers evaluated were:

1—A polycarbonate (Lexan ®)
2—Polymethyl methacrylate
3—A polyimide (Kapton ®)
4—Polyethylene terephthalate (Mylar ®)
5—Polyethylene
6—Polypropylene
7—The cured elastomer substrate of Example 1

The numbers immediately to the left of each of the polymers are employed to identify the polymers in the following table. Kapton and Mylar are registered trademarks of E. I. duPont deNemours and Company, Wilmington, Del., and Lexan is a registered trademark of the General Electric Company.

TABLE

| Solvent | Copolymer Concentration (%) | Appearance of Coating on Polymer[1] | | | | | | |
|---|---|---|---|---|---|---|---|---|
| | | 1 | 2 | 3 | 4 | 5 | 6 | 7 |
| Cyclic oligomer[2] | 20 | C | C | C | C | C | C | C |
| Toluene (control) | 70 | C | C | C | C | C | C | C |
| Toluene (control) | 50 | D | D | D | D | D | D | D |
| Toluene (control) | 20 | D | D | D | D | D | D | D |
| Chlorothene (control) | 20 | D | D | D | D | D | D | D |
| Butyl acetate (control) | 20 | D | D | D | D | D | D | D |

[1]C = Continuous Coating
D = Discontinuous Coating
[2]Octamethylcyclotetrasiloxane The data in the table demonstrate that while a continuous, coherent coating could be formed from a 70% by weight solution of the organosiloxane block copolymer in toluene, only the octamethylcyclotetrasiloxane solution formed a continuous coating when the copolymer concentration was reduced to 20% by weight.

That which is claimed is:

1. A liquid composition comprising
(A) from 5 to 60%, based on the weight of said composition, of at least one solubilized, room temperature curable block copolymer comprising
   (1) at least one diorganosiloxane block containing an average of from 15 to 350 repeating units per block, where at least 80 mol % of the units are dimethylsiloxane units, any remaining units being selected from methylphenylsiloxane and methylsiloxane;
   (2) at least one block containing at least three repeating units of the formula $$R_y{}^1 SiO_{\frac{4-y}{2}}$$

where y has a value of from 1 to 1.3 and R$^1$ represents a monovalent hydrocarbon radical wherein at least 50% of the radicals are phenyl with any remainder being selected from the group consisting of vinyl, methyl, ethyl, and propyl; and
   (3) from 3 to 25%, based on the total number of units present in said block copolymer, of terminal units represented by the formula $$R^2 SiY_z O_{\frac{3-z}{2}}$$

where z has an average value of from 1.8 to 2, inclusive, R$^2$ is alkyl containing from 1 to 6 carbon atoms, phenyl, or vinyl, Y is selected from the group consisting of alkoxy containing from 1 to 5 carbon atoms, acetoxy, and radicals of the formula —ON=Z where Z is

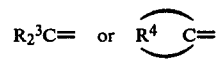

where each $R^3$ contains from 1 to 4 carbon atoms and is individually selected from monovalent hydrocarbon radicals and halogenated monovalent hydrocarbon radicals and $R^4$ contains from 2 to 5 carbon atoms and is selected from the group consisting of divalent hydrocarbon radicals and halogenated divalent hydrocarbon radicals;

wherein the molar ratio of units in the diorganosiloxane block to $R_{y^1}SiO_{(4-y)/2}$ units is from 0.7 to 3.5, and units wherein $R^1$ is phenyl constitute more than about 20 mol % of the total units present in said block copolymer; and (B) a solvent for said block copolymer, said solvent comprising at least 45% by weight of at least one cyclic polydimethylsiloxane of the formula $[(CH_3)_2SiO]_x$ where x has an average value of from 3 to 8 inclusive.

2. A composition according to claim 1 wherein all of the repeating units of said diorganosiloxane block are dimethylsiloxane units.

3. A composition according to claim 1 wherein all of the radicals represented by $R^1$ are phenyl.

4. A composition according to claim 1 wherein $R^2$ is methyl.

5. A composition according to claim 1 wherein Y is alkoxy.

6. A composition according to claim 5 wherein Y is methoxy.

7. A composition according to claim 1 wherein Y is ON=$CR_2^3$ and each $R^3$ is individually selected from the group consisting of methyl, ethyl, and vinyl.

8. A composition according to claim 1 wherein the average value of x is 4.

9. A composition according to claim 1 wherein said block copolymer constitutes from 10 to 60 % of the total weight of said composition.

10. A composition according to claim 1 wherein the solvent contains up to 33%, based on the weight of said solvent, of an organic liquid that is a solvent for said organosiloxane block copolymer.

11. A composition according to claim 1 wherein Y represents methoxy and said composition contains an amount of an organotitanium compound sufficient to promote curing of said block copolymer at ambient temperature in the presence of moisture.

12. A method for coating substrates with organosiloxane block copolymers, said method comprising (I) applying to a solid substrate selected from the group consisting of organic polymers and cured silicone rubbers at least one coherent layer of a liquid composition comprising (A) from 5 to 60%, based on the weight of said composition, of at least one solubilized room temperature curable block copolymer comprising (1) at least one diorganosiloxane block containing an average of from 15 to 350 repeating units per block, where at least 80 mol % of the units are dimethylsiloxane units, any remaining units being selected from methylphenylsiloxane and methylsiloxane;

(2) At least one block containing at least three repeating units of the formula $$R_{y^1}SiO_{\frac{4-y}{2}}$$

where y has a value of from 1 to 1.3 and $R^1$ represents a monovalent hydrocarbon radical wherein at least 50% of the radicals are phenyl with any remainder being selected from the group consisting of vinyl, methyl, ethyl and propyl; and (3) from 3 to 25%, based on the total number of units present in said block copolymer of terminal units represented by the formula $$R^2SiY_zO_{\frac{3-z}{2}}$$

where z has an average value of from 1.8 to 2, inclusive, $R^2$ is alkyl containing from 1 to 6 carbon atoms, phenyl, or vinyl, Y is selected from the group consisting of alkoxy containing from 1 to 5 carbon atoms, acetoxy and radicals of the formula —ON=Z where Z is $$R_2^3C= \quad \text{or} \quad R^4\overset{\frown}{\phantom{X}}C=$$

where each $R^3$ contains from 1 to 4 carbon atoms and is individually selected from monovalent hydrocarbon radicals and halogenated monovalent hydrocarbon radicals and $R^4$ contains from 2 to 5 carbon atoms and is selected from the group consisting of divalent hydrocarbon radicals and halogenated divalent hydrocarbon radicals;

wherein the molar ratio of units in the diorganosiloxane block to $R_{y^1}SiO_{(4-y)/2}$ units is from 0.7 to 3.5, and units wherein $R^1$ is phenyl constitute more than about 20 mol % of the total units present in said block copolymer; and (B) a solvent for said block copolymer, said solvent comprising at least 45% by weight of at least one cyclic polydimethylsiloxane of the formula $[(CH_3)_2SiO]_x$ where x has an average value of from 3 to 8 inclusive;

(B) evaporating volatile solvents, and (III) curing said organosiloxane block copolymer.

13. A method according to claim 12 wherein all of the units of said diorganosiloxane block are dimethylsiloxane units.

14. A method according to claim 12 wherein all of the radicals represented by $R^1$ are phenyl.

15. A method according to claim 12 wherein $R^2$ is methyl.

16. A method according to claim 12 wherein Y is alkoxy.

17. A method according to claim 16 wherein Y is methoxy.

18. A method according to claim 12 wherein Y is ON=$CR^3$ and each $R^3$ is individually selected from the group consisting of methyl, ethyl, and vinyl.

19. A method according to claim 12 wherein the average value of x is 4.

20. A method according to claim 12 wherein said copolymer constitutes from 10 to 60% of the total weight of said composition.

21. A method according to claim 12 wherein the solvent contains up to 33%, based on the weight of said solvent, of an organic liquid that is a solvent for said organosiloxane block copolymer.

22. A method according to claim 12 wherein Y represents methoxy and said composition contains an amount of an organotitanium compound sufficient to promote curing of said block copolymer at ambient temperature in the presence of moisture.

23. A method according to claim 12 wherein said substrate is an organic polymer and is selected from the group consisting of polyolefins, polycarbonates, polyesters, polyimides, and polyacrylates.

24. A method according to claim 12 wherein said silicone rubber is a polydimethylsiloxane elastomer.

25. A method according to claim 12 wherein the layer of said liquid composition exhibits a thickness of less than 0.013 cm.

* * * * *

UNITED STATES PATENT AND TRADEMARK OFFICE
CERTIFICATE OF CORRECTION

PATENT NO. : 4,443,502
DATED : April 17, 1984
INVENTOR(S) : Beth I. Gutek

It is certified that error appears in the above-identified patent and that said Letters Patent is hereby corrected as shown below:

In column 2, line 3 and column 3, line 50, "avrage" should read -- average --.

In column 2, line 13, "temprature" should read -- temperature --.

In column 6, line 44, "or" should read -- to --.

In column 7, line 48, "paticles" should read -- particles --.

In column 8, line 12, "followingmaterials" should read -- following materials --.

In column 8, line 26, "of 6%" should read -- of 6%. --.

In column 8, line 52, "180parts" should read -- 180 parts --.

In column 8, line 53 "6.6parts" should read -- 6.6 parts --.

Signed and Sealed this

Nineteenth Day of February 1985

[SEAL]

Attest:

DONALD J. QUIGG

Attesting Officer     Acting Commissioner of Patents and Trademarks